(12) United States Patent
Permandla et al.

(10) Patent No.: US 8,224,841 B2
(45) Date of Patent: Jul. 17, 2012

(54) DYNAMIC UPDATE OF A WEB INDEX

(75) Inventors: Pratibha Permandla, Redmond, WA (US); Gaurav Sareen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 532 days.

(21) Appl. No.: 12/127,949

(22) Filed: May 28, 2008

(65) Prior Publication Data

US 2009/0299962 A1  Dec. 3, 2009

(51) Int. Cl.
G06F 17/30 (2006.01)
(52) U.S. Cl. ........................................ 707/769; 707/741
(58) Field of Classification Search ................... 707/706, 707/707, 711
See application file for complete search history.

(56) References Cited

U.S. PATENT DOCUMENTS

| 6,931,397 | B1 | 8/2005 | Sundaresan | |
|---|---|---|---|---|
| 7,016,914 | B2 | 3/2006 | Nayak | |
| 7,228,301 | B2 | 6/2007 | Meyerzon | |
| 7,228,360 | B2 * | 6/2007 | Allen et al. | 709/245 |
| 7,299,404 | B2 | 11/2007 | Agarwal | |
| 2003/0046311 | A1 * | 3/2003 | Baidya et al. | 707/200 |
| 2003/0191737 | A1 * | 10/2003 | Steele et al. | 707/1 |
| 2006/0041606 | A1 | 2/2006 | Sawdon | |
| 2007/0078939 | A1 * | 4/2007 | Kallen | 709/207 |
| 2007/0112761 | A1 | 5/2007 | Xu | |
| 2007/0208716 | A1 | 9/2007 | Krishnaprasad | |
| 2007/0214239 | A1 | 9/2007 | Mechkov | |
| 2008/0027971 | A1 | 1/2008 | Statchuk | |
| 2009/0240674 | A1 * | 9/2009 | Wilde et al. | 707/4 |
| 2011/0016106 | A1 * | 1/2011 | Xia | 707/706 |

OTHER PUBLICATIONS

Feed Search vs. Web Search, http://jeremy.zawodny.com/blog/archives/002454.html.
WebBase: A Repository of Web Pages, http://www.almaden.ibm.com/cs/people/rsriram/pubs/archiver.pdf.
Efficient Update of Indexes for Dynamically Changing Web Documents, www.springerlink.com/index/A478912013J42722.pdf.

* cited by examiner

*Primary Examiner* — Fred I Ehichioya
*Assistant Examiner* — Sabana Rahman
(74) *Attorney, Agent, or Firm* — Shook, Hardy & Bacon, L.L.P.

(57) ABSTRACT

Systems and methods are provided for regularly updating a web index with new or updated content, such as meta words or meta streams, for a particular web page address, such as a URL. Web page addresses and associated updated information, such as meta words, meta streams, values, and locations in the web index for those meta words are received. In order to update a web index, which is used by search engines to search web documents, a document identification is retrieved and associated with the updated information. As information in the web index is stored by document identification and not by web page addresses, the document identification may replace the web page address. Each meta word received is matched with corresponding document identifications and associated updated information, which creates an inverted format of the information. The web index may now be updated and stored by the system.

20 Claims, 4 Drawing Sheets

DYNAMIC UPDATE OF A WEB INDEX

BACKGROUND

Web crawlers typically browse web documents in the World Wide Web at pre-determined time intervals, which may vary from several days to months. This time period may depend on the type or importance of a particular web document. Although an entire web index may be replaced each time it is crawled, the increment of time between crawl cycles may be too long to keep the web index current. For example, if certain information changes for a particular web document between crawl cycles, this information may not be reflected in search results, and as a result, a user may not be provided with current search results.

SUMMARY

Embodiments of the present invention relate to systems, methods, and computer-readable media for dynamically updating a web index with meta words and associated information, such as values and locations in the web index for the meta words. Once this updated information is received, a document identification is retrieved for each web page address and may be associated with the updated information for each web page address. Each meta word received may be mapped with the corresponding document identifications and updated information, and an updated web index is generated and stored. The updated web index may then be queried by search engines for updated information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the attached drawing figures, wherein.

DETAILED DESCRIPTION

Figure 1:
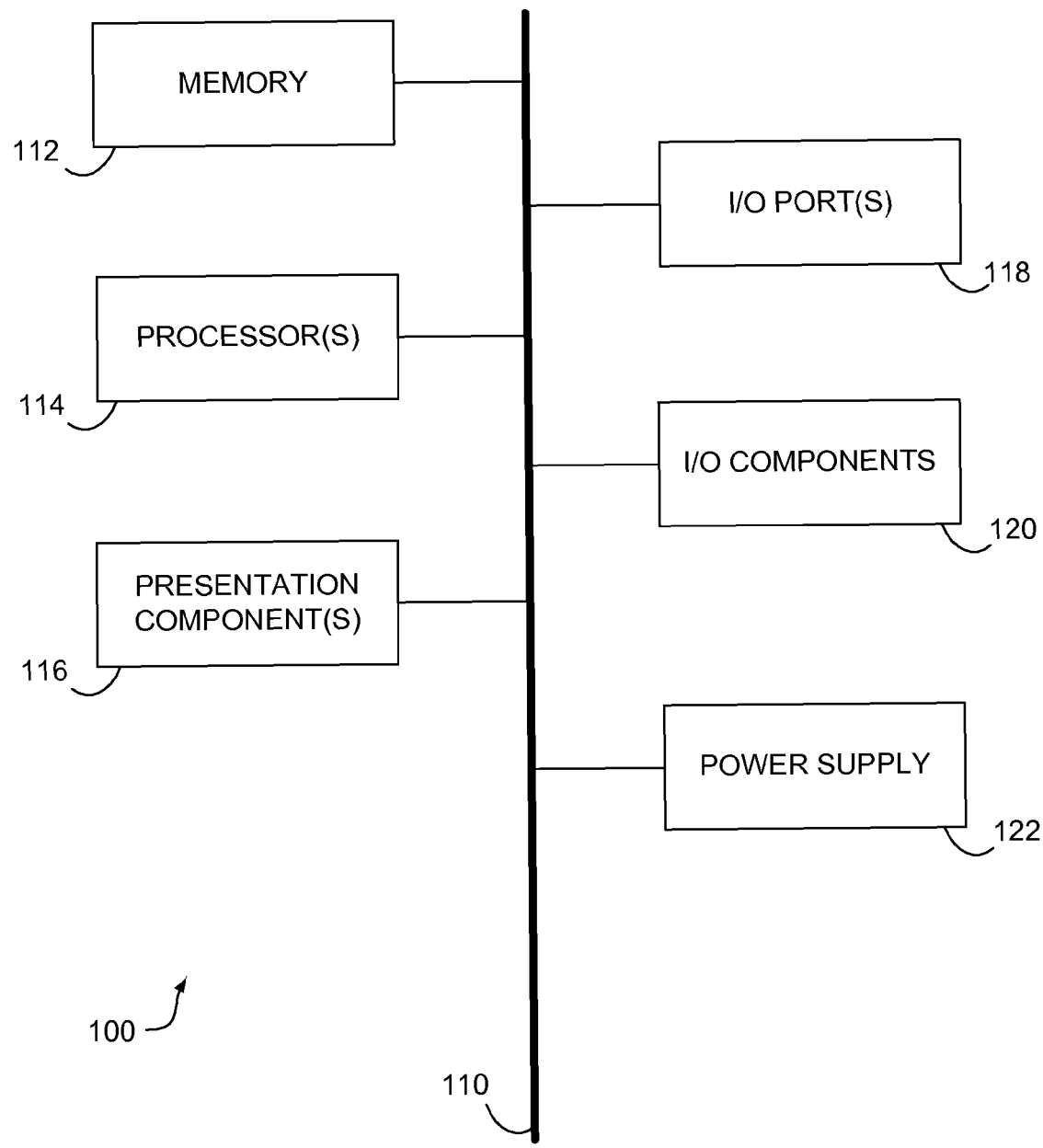
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention relates to systems, methods, and computer storage media for dynamically updating a web index with updated information to generate an updated web index, wherein an updated web index may be generated at regular intervals, such as one time each day. Information to be updated is received, and is formatted in such a way as to associate the updated information for each web page address with each meta word received. An updated web index is generated and stored so that the updated information may be searched by a search engine, for example.

Accordingly, in one aspect, the present invention provides a computer-implemented method for dynamically updating a web index with updated data to generate an updated web index. The method includes receiving one or more web page addresses and associated data for each of the one or more web page addresses, which are utilized to update the web index, wherein the associated data comprises one or more meta words. The method further comprises accessing a data store to determine a document identification for each of the one or more web page addresses received, and associating the document identifications with the one or more web page addresses and associated data received. The web page addresses are replaced with the corresponding document identifications. For each of the one or more meta words received, the corresponding document identifications and other associated data are correlated. Further, the corresponding meta words in the web index are updated with the associated document identifications and other associated data to generate an updated web index, which may then be stored.

In another aspect, the present invention provides for a computerized system for dynamically updating a web index with metadata to generate an updated web index. The system includes a receiving component configured for receiving one or more web page addresses and associated data for the web page addresses, which are utilized to update the web index. The associated data comprises one or more of meta words, values for those meta words, and locations in the web index for the meta words. Further, an accessing component is configured to access a data store to determine a document identification for each of the web page addresses, an associating component is configured to associate the document identifications with the web page addresses and associated data received, and also replaces the web page addresses with the corresponding document identifications. The system also includes an inverting component that is configured for associating each of the one or more meta words received with the corresponding document identifications, the values for the one or more meta words, and the locations in the web index of the meta words. The web index is then updated by an updating component, which is configured to update the corresponding meta words in the web index with the associated document identifications, values for the meta words, and the locations in the web index of the meta words. The updated web index is then stored.

In a third aspect, the present invention provides a computer-readable media having computer-executable instructions embodied thereon that, when executed, perform a method for dynamically updating a web index with a spam meta word and associated metadata to generate an updated web index. The method includes receiving one or more web page addresses and associated spam metadata for each of the one or more web page addresses to be utilized to update the web index. The associated spam metadata comprises one or more of a spam meta word, a value of the spam meta word, or a location of the spam meta word in the web index. The method further includes accessing a data store to determine one or more document identifications for the web page addresses received, associating the document identifications with the web page addresses and associated spam metadata received, replacing the web page addresses with the corresponding document identifications, and associating the corresponding document identifications and associated spam metadata for each spam meta word received. Further, the corresponding spam meta words in the web index are updated with each of the associated document identifications, the spam meta word values, and the locations of the spam meta words in the web index to generate an updated web index. The web index is not replaced during this process, but is updated without replacing the entire web index. The updated web index is then stored.

Having briefly described an overview of exemplary embodiments of the present invention, an exemplary operating environment for the present invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computer 110 typically includes a variety of computer-readable media. Computer-readable media can be any available media that can be accessed by computer 110 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display, speaker, printing component, vibrating component, etc.

I/O ports 118 allow computing device 100 to be logically coupled to other devices, including I/O components 120, some of which may be built in. Illustrative components include a microphone, joystick, game pad, satellite dish, scanner, printer, wireless device, etc.

Figure 2:
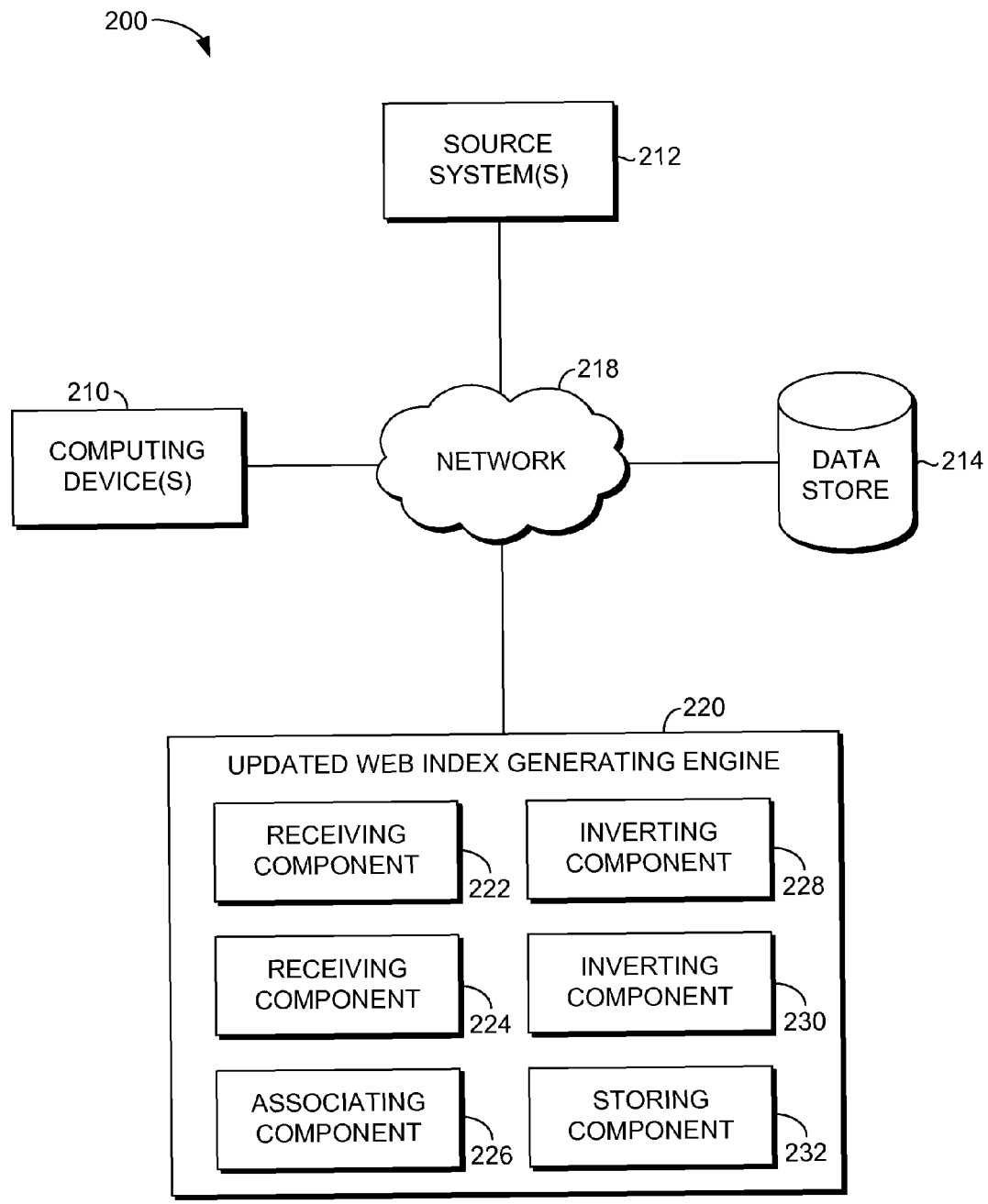
FIG. 2 is a block diagram of an exemplary system according to an embodiment of the present invention.

Turning now to FIG. 2, a block diagram is illustrated, in accordance with an embodiment of the present invention, showing a system 200 configured to generate an updated web index. It will be understood and appreciated by those of ordinary skill in the art that the updated web index generating system 200 shown in FIG. 2 is merely an example of one suitable computing system environment and is not intended to suggest any limitation as to the scope of use or functionality of embodiments of the present invention. Neither should the system 200 be interpreted as having any dependency or requirement related to any single component or combination of components illustrated therein. Further, the system 200 may be provided as a stand-alone product, as part of a software development environment, or any combination thereof.

The system 200 includes one or more user computing devices 210, one or more source systems 212 (e.g., websites and the like), data store 214, and an updated web index generating engine 220, all in communication with one another via a network 218. The network 218 may include, without limitation, one or more local area networks (LANs) and/or wide area networks (WANs). Such networking environments are commonplace in offices, enterprise-wide computer networks, intranets, and the Internet. Accordingly, the network 218 is not further described herein.

Each of the computing device 210 and the updated web index generating engine 220 shown in FIG. 2 may be any type of computing device, such as, for example, computing device 100 described above with reference to FIG. 1. By way of example only and not limitation, each of the computing device 210 and the updated web index generating engine 220 may be a server a personal computer, desktop computer, laptop computer, handheld device, mobile handset, consumer electronic device, and the like. Additionally, the user computing device 210 may further include a keyboard, keypad, stylus, joystick, and any other input-initiating component that allows a user to provide wired or wireless data to the network 218, e.g., data elements to be processed and warehoused, and the like. It should be noted, however, that the present invention is not limited to implementation on such computing devices, but may be implemented on any of a variety of different types of computing devices within the scope of embodiments hereof.

One or more source systems, represented by item 212, may be provided to determine which web documents contain data to be updated in a web index. These may include, for example, an application, such as a spam finding application, for example, that scans web documents for spam. An application such as this may also determine a value for the meta word, such as a spam value. Updated meta words and associated values may also be found by the use of various algorithms.

Data store 214 is configured to store information related to the generation of updated web indexes. In various embodiments, such information may include, without limitation, data files received, document identifications for the web page addresses (e.g., document identification to web page address parings), web indexes and subsequent updated web indexes, and the like. In embodiments, the data store 214 is configured to be searchable for one or more of the items stored in association therewith. It will be understood and appreciated by those of ordinary skill in the art that the information stored in the data store 214 may be configurable and may include any information relevant to the generation of updated web indexes. The content and volume of such information are not intended to limit the scope of embodiments of the present invention in any way. Further, though illustrated as a single, independent component, data store 214 may, in fact, be a plurality of data stores, for instance, a database cluster, portions of which may reside on one or more user computing device 210, the updated web index generating engine 220, another external computing device (not shown), and/or any combination thereof. For example, one data store may store document identifications (e.g., document identification to web page address pairings), and another data store may store the web index, and subsequent updated web indexes, as they are generated.

As shown in FIG. 2, the updated web index generating engine 220 includes a receiving component 222, an accessing component 224, an associating component 226, an inverting component 228, an updating component 230, and a storing component 232. In some embodiments, one or more of the illustrated components 222, 224, 226, 228, 230, and 232 may be implemented as stand-alone applications. In other embodiments, one or more of the illustrated components 222, 224, 226, 228, 230, and 232 may be integrated directly into the operating system of the updated web index generating engine 220 and/or one or more of the user computing devices 210. It will be understood by those of ordinary skill in the art that the components 222, 224, 226, 228, 230, and 232 illustrated in FIG. 2 are exemplary in nature and in number and should not be construed as limiting. Any number of components may be employed to achieve the desired functionality within the scope of embodiments of the present invention.

In some embodiments, a determining component may be present to determine that one or more web page addresses have updated associated data. Receiving component 222 is configured for receiving web page addresses (e.g., URLs) and associated data for each of the web page addresses. The web page addresses and associated data are received for the purpose of updating a web index. Associated data may include any metadata or other information that may be used to update a web index, such as, but not limited to, a meta word, a value of the meta word, and a location of the meta word in the web index, which allows the meta word to be easily located during the updating process. The web page addresses and associated data may be received from one of many sources, such as any external source, or a project team that determines when web page documents have updated information. Web page addresses may be the address or URL for a particular web page document.

Metadata may be any piece of information that describes a web document. For example, the language of a document may be metadata. Metadata, in general, is information that describes any type of information in a web page document. A meta word is a word that describes an aspect of a document (e.g., a characteristic of a document, an element of a document). Further, meta words are typically not located or included within web page documents, but may represent an element found within the document or a characteristic of that document. For example, "_SpamMetaWord" represents the meta word "spam." While _SpamMetaWord or even the word "spam" may not appear in a web page document, it may indicate that the particular page should be marked as spam, as it represents a characteristic of that document. In some cases, web page documents marked as spam are not provided as search results to users. Other meta words may include, but are not limited to, language (e.g., language of a web document), location (e.g., country of origin of a web document), or type (e.g., type of a web document).

As indicated above, other associated data may include a value for a meta word. For example, if _SpamMetaWord represents a web page document that is identified as spam, there may be a value (e.g., spam value) associated with _SpamMetaWord. For example, in one instance, the spam value may be 10, but in another instance, it may have increased to 20, such as on a different day or week. In addition, associated data may be a location of a meta word in the web index. This assists in the web index updating process.

Accessing component 224 is configured for accessing a data store, such as data store 214 in FIG. 2, to determine a document identification for each web page address received by receiving component 222, for example. Document identification to web page address pairings (e.g., here is the document identification to web page address pairing: (100: www.xyz.com)) are stored in a data store so that document identifications may be associated with the associated data. As previously described, the input to the system is web page addresses and associated data for each web page address. In the web index, however, the information is stored as document identifications that correspond to the web page addresses. Therefore, accessing component 224 performs the function of locating document identifications for the web page addresses. The data store used for this purpose may be a separate data store than the data store used to store other types of information, such as the web index. In some embodiments, however, there may be a single data store used for storing both types of information.

Associating component 226 is configured for associating a document identification with the corresponding web page address and associated data received by receiving component 222, for example. As mentioned above, in order to update a web index, the document identification corresponding to a particular web page address may need to be obtained, and may be obtained by accessing component 224. Once obtained, the associated data is correlated with the accessed document identification, and the document identification replaces the web page addresses in the mapping of web page address to associated data. The new mapping pairs document identifications to associated data.

Inverting component 228 is configured for associating the meta words with the corresponding document identification and associated data, such as the value for the meta word and the location of the meta word in the web index. As a result, an inverted index may be generated. Similar to the index of a book, an inverted index lists each meta word received, and for each meta word received, it may list each document identification that is associated with that meta word. In addition to listing each associated document identification, associated data may also be listed for each meta word. Thus, inverting component 228 inverts the document identification to associated data mapping into meta word to document identification and associated data mapping.

Updating component 230 is configured for updating the corresponding meta words in the web index with the associated document identifications and associated data, such as the meta word values and the locations for the meta words in the web index. Updating component 230 may locate a particular meta word in the web index that requires updating by using the location information received, as discussed above. It may do this for each meta word that has associated updated information. Embodiments of the present invention do not replace an entire web index with new information, but may update any number of meta words at one time. For example, one meta word may be updated, and the other information in the web index may not change. Only the information to be updated is replaced in a web index, not the entire web index.

Lastly, storing component 232 is configured for storing the updated web index. In some embodiments, a web index is updated at pre-determined intervals of time, such as, each day, every two days, more than one time per day, and the like.

In one embodiment of FIG. 2, a web document has a web page address of www.abc.com. This web document currently has a meta word "spam," (e.g., _SpamMetaWord) with a spam value of 10. Since the last time this web document was crawled by a web crawler, the spam value may have increased (e.g., from 10 to 20). Another web document has a web page address of www.xyz.com, and currently does not have a meta word "spam." In this embodiment, since the web document was crawled, it has acquired a meta word "spam" with a spam value of 15. The location of the meta word "spam" is at offset location 1 in the web index. As previously described, receiving component 222 may receive this information in the form of one or more data file. For example, this information may be received in the following format:
www.abc.com: _SpamMetaWord, 20, 1
www.xyz.com: _SpamMetaWord, 15, 1

Once this information is received, accessing component 224 may access a data store, such as data store 214 of FIG. 2, to retrieve a document identification for each web page address, which, in this embodiment, includes www.abc.com and www.xyz.com. The document identifications retrieved by accessing component 224 for www.abc.com and www.xyz.com are 100 and 150, respectively. These pairings may look similar to the following:
100: www.abc.com
150: www.xyz.com Associating component 226 associates these document identifications with www.abc.com, www.xyz.com, and associated data for each web page address. Once associated, the web page addresses may be replaced by the corresponding document identifications, and may then have the following format:
100:_SpamMetaWord, 20, 1
150:_SpamMetaWord, 15,1

Next, inverting component 228 inverts the document identification to associated data mappings, so that each meta word (e.g., _SpamMetaWord) is associated with each document identification and other associated data, such as, but not limited to, the value for each meta word and the location of each meta word in the web index. Once inverted, the data may have the following format, which is a meta word to document identification and associated data mapping:
_SpamMetaWord: (100, 20, 1), (150, 15, 1)

As previously mentioned, prior to receiving the updated information, the web index may have the following information about the meta word "spam":
_SpamMetaWord: (100, 10, 1)
This includes only a spam value and location for www.abc.com, as www.xyz.com previously did not have a meta word "spam." Now, updating component 230 may update the spam meta word(s) in the web index with the new and updated information, which, in this embodiment, may look like: (100, 20, 1) and (150, 15, 1). An updated web index may now be generated. As discussed above, the only modification to the web index is this updated information. The entire web index is not replaced, only the updated information, which in many cases, may be a very small portion of the entire web index. The updated web index may be stored by storing component 232. When a query is received for specific information contained in a web document, the updated web index may be searched, and will reflect the updated metadata in www.abc.com and www.xyz.com.

Figure 3:
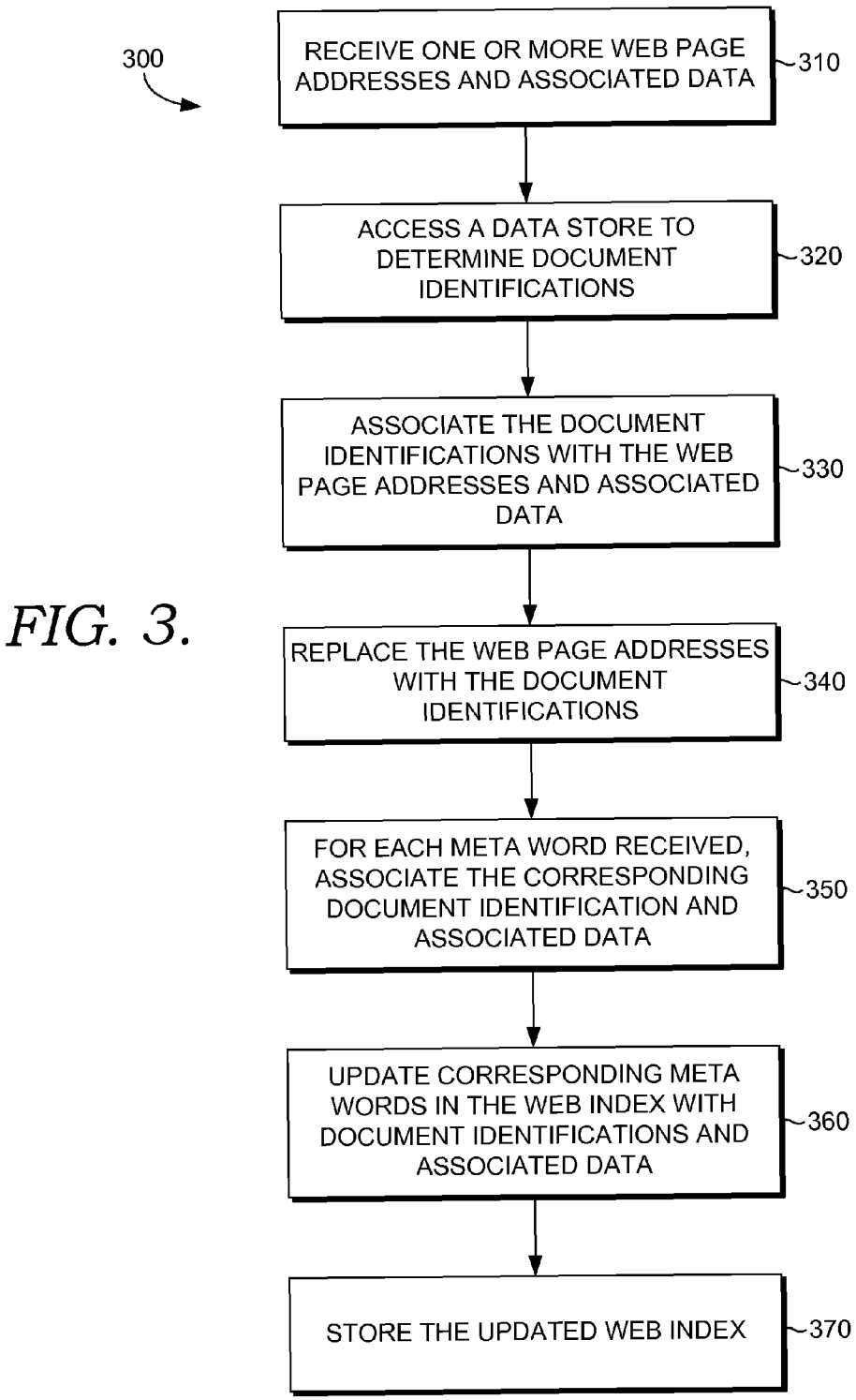
FIG. 3 is a flow diagram of a method for dynamically updating a web index with updated data to generate an updated web index, in accordance with an embodiment of the present invention.

Turning now to FIG. 3, a flow diagram is illustrated of a method 300 for dynamically updating a web index with updated data to generate an updated web index, in accordance with an embodiment of the present invention. At step 310, one or more web page addresses and associated data are received, for example, by receiving component 222 in FIG. 2. The associated data may be any type of metadata, which is any information that describes a web document. For example, the associated data may include, but is not limited to, a meta word, a value for the meta word, and a location of the meta word in a web index. As described above, a meta word is a word that describes an aspect of a document (e.g., a characteristic of a document, an element of a document). Meta words are typically not located or included within web page documents, but may represent an element found within the document or a characteristic of that document. Returning to the previous example of a meta word represented as _SpamMetaWord, a value may be associated with this meta word for a particular web page address. For instance, www.abc.com: _SpamMetaWord, 20, 1 indicates that _SpamMetaWord has a spam value of 20.

Step 320 indicates that a data store is accessed to determine document identifications for the web page addresses. Typically, each web page address has a document identification. Document identifications may be stored as pairings of document identification to web page address, which, in returning to the previous example, may look similar to the following:
100: www.abc.com
150: www.xyz.com
Once the document identifications are accessed by, for example, accessing component 224, the document identifications may be associated with the web page addresses and associated data at step 330. Associating this information may include mapping a document identification to the corresponding web page address and associated data. At step 340, the web page address in the paring of web page address to associated data may be replaced by the corresponding document identification. This may be done for each web page address that was received at step 310. After step 340, the information, using the previous example, may look similar to the following:
100: _SpamMetaWord, 20, 1
150: _SpamMetaWord, 15,1

At step 350, for each meta word received, the corresponding document identification and other associated data, such as the value for each meta word and location of each meta word in a web index, are associated. Again, using the previous example, the information may look similar to the following:
_SpamMetaWord: (100, 20, 1), (150, 15, 1)
In the previous example, each of www.abc.com and www.xyz.com contains a meta word "spam," and therefore the document identification and associated data for each of the web page addresses is listed beside _SpamMetaWord. The process described above in regard to step 350 is an inversion process of the information. Once inverted, the web index may be referred to as an inverted web index.

Once document identifications and associated data are associated with each meta word received, these meta words in the web index may be updated with the updated document identifications and associated data at step 360. An updated web index is generated, and is then stored at step 370. The entire web index is not replaced at step 360. Rather, only the updated information received at step 310 is added or updated to the web index. In many embodiments, a very small amount of data may be modified in a web index when an updated web index is generated. In one embodiment, the updated data may affect one meta word only. In this embodiment, the only change to the web index may be the addition or modification of data associated with that meta word.

Figure 4:
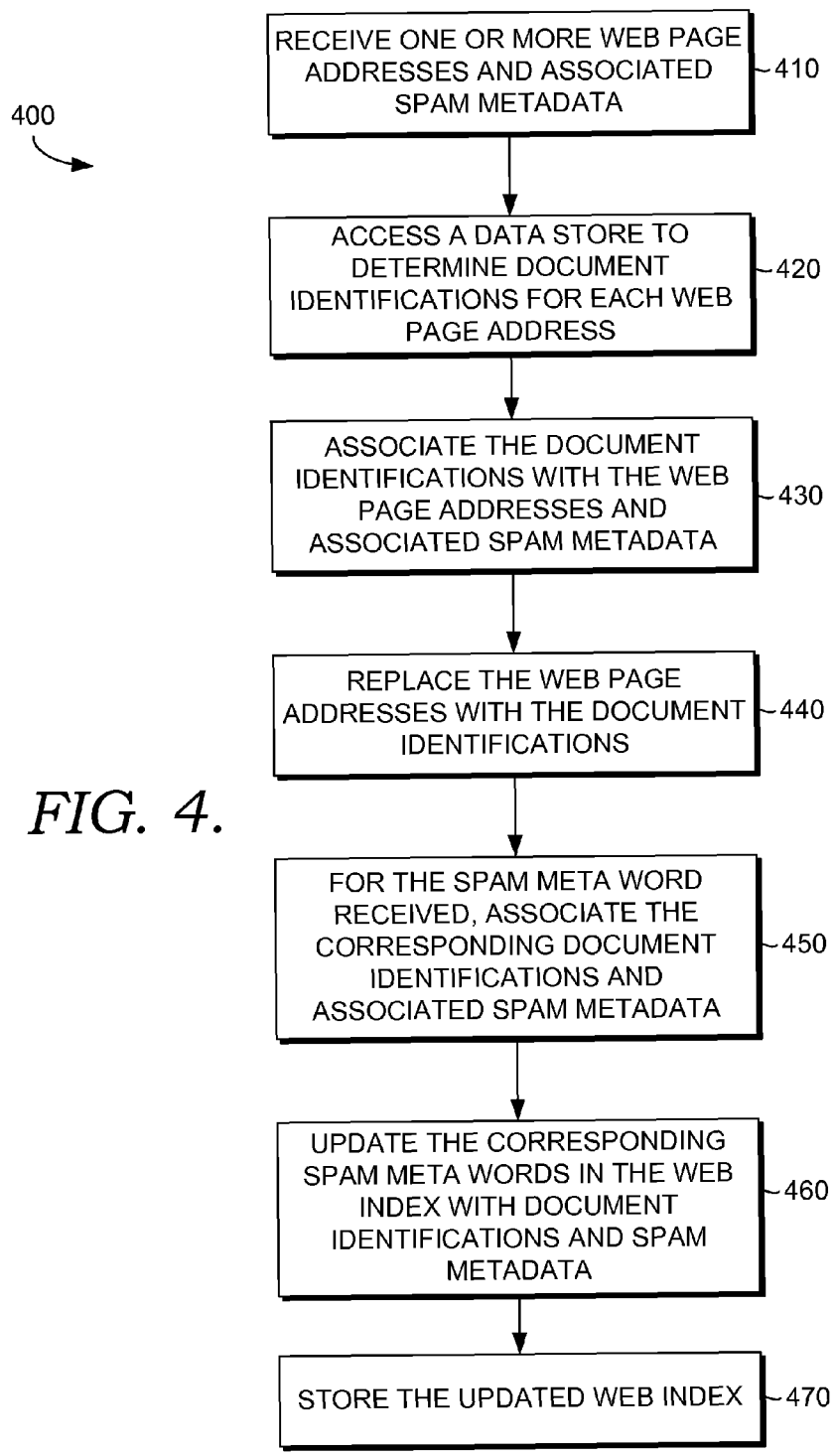
FIG. 4 is a flow diagram of a method for dynamically updating a web index with a spam meta word and associated metadata to generate an updated web index, in accordance with an embodiment of the present invention.

Referring to FIG. 4, a flow diagram is illustrated of a method 400 for dynamically updating a web index with a spam meta word and associated spam metadata to generate an updated web index, in accordance with an embodiment of the present invention. FIG. 4 is presented to illustrate an example as to a specific meta word and its associated data. It will be understood by one skilled in the art that although the meta word spam, represented as _SpamMetaWord, is used in the embodiment of FIG. 4, any meta word is contemplated to be within the scope of the present invention. Other meta words may include, but are not limited to, price, language, and location.

Step 410 indicates that web page addresses and associated spam metadata are received. The associated data may include one or more of a spam meta word, a value for the spam meta word, or a location of the spam meta word in the web index. This information may be received as a data file, and may be received in one of many formats (e.g., www.abc.com: _SpamMetaWord, 20, 1). A data store is accessed at step 420 to determine document identifications for the web page addresses received. In many embodiments, each web page address received has a corresponding document identification, which may be stored in a data store, such as data store 214 in FIG. 2 (e.g., may be stored as 100: www.abc.com). Next, at step 430, the document identifications are associated with the web page addresses and associated spam metadata received. Once associated, the web page addresses are replaced with the accessed document identifications at step 440, such that the format of the resulting information, using the previous example, may be similar to 100: _SpamMetaWord, 20, 1.

At step 450, for the spam meta word received, the corresponding document identifications and associated spam metadata are associated. Returning to the previous example, the format of the information may be similar to _SpamMetaWord: (100, 20, 1), (150, 15, 1), wherein the two sets of data following the _SpamMetaWord represent a document identification and associated data for each of the two web page addresses received at step 410. The corresponding spam meta word in the web index is updated with the document identifications and spam metadata at step 460 to generate an updated web index. As previously mentioned, the entire web index is not replaced at step 460. Rather, the only change to the web index may be the addition or modification of data associated with the meta words received at step 410. At step 470, the updated web index is stored.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the methods. It will be understood that certain features and sub-combinations are of utility and may be employed without reference to other features and sub-combinations. This is contemplated by and is within the scope of the claims.

What is claimed is:

1. A computer-implemented method for dynamically updating a web index with updated data to generate an updated web index, the method comprising:
   receiving one or more web page addresses and associated data for each of the one or more web page addresses to be utilized to update the web index, wherein the associated data comprises one or more meta words;
   accessing a data store to determine a document identification ("document ID") that corresponds to each of the one or more web page addresses received, wherein the data store includes stored web page addresses that are paired with stored document IDs, wherein a pairing between a stored web page address and a stored document ID indicates that the document ID corresponds to the stored web page address;
   determining the document ID that corresponds to each of the one or more web page addresses received based on a pairing between the web page address and the document ID as stored in the data store;
   associating the document IDs with the one or more web page addresses and associated data received;
   replacing the one or more web page addresses with the corresponding document IDs, wherein the associated data received is associated with the corresponding document IDs, rather than with the one or more web page addresses, in an inverted index;
   identifying one or more document IDs and the other associated data that are associated with each of the one or more meta words received;
   associating the one or more document IDs and the other associated data with each of the one or more meta words received to generate the inverted index comprising information used to update the web index, wherein the inverted index is indexed by the one or more meta words;
   updating the corresponding one or more meta words in the web index with the information in the inverted index to generate an updated web index, wherein within the updated web index the one or more meta words are associated with corresponding document IDs rather than associated with the web page addresses; and
   storing the updated web index.

2. The method of claim 1, wherein the associated data further comprises one or more of values for the one or more meta words, or locations in the web index of the one or more meta words.

3. The method of claim 1, wherein updating the corresponding one or more meta words in the web index occurs without replacing the entire web index.

4. The method of claim 1, wherein the associated data is metadata.

5. The method of claim 1, further comprising:
determining that the one or more web page addresses have associated data that has been updated.

6. The method of claim 1, wherein the updated web index is generated at predetermined intervals of time.

7. The method of claim 1, wherein the updated web index is generated one time per day.

8. The method of claim 1, wherein at least one of the one or more meta words received for a particular web page address is not contained in the web index.

9. The method of claim 8, wherein the value of the at least one of the one or more meta words is updated in the web index for the particular web page address.

10. The method of claim 1, further comprising:
receiving a query from a user; and
searching the updated web index for the query.

11. A computerized system for dynamically updating a web index with metadata to generate an updated web index, the system comprising:
a processor;
a receiving component configured for receiving one or more web page addresses and associated data for each of the one or more web page addresses to be utilized to update the web index, wherein the associated data comprises at least one or more meta words, values for the one or more meta words, or locations in the web index of the one or more meta words;
an accessing component configured for accessing a data store to determine a document identification ("document ID") corresponding to each of the one or more web page addresses, wherein the data store includes stored web page addresses that are paired with stored document IDs, wherein a pairing between a stored web page address and a stored document ID indicates that the document ID corresponds to the stored web page address;
an associating component configured for associating a document ID with each of the one or more web page addresses and associated data received, wherein each of the one or more web page addresses is replaced by the corresponding document ID;
an inverting component configured for associating each of the one or more meta words received with the corresponding document IDs, the values for the one or more meta words, and the locations in the web index of the one or more meta words such that an inverted index is generated that comprises information used to update the web index, wherein the inverted index is indexed by the one or more meta words;
an updating component configured for updating the corresponding one or more meta words in the web index utilizing the generated inverted index comprising the document IDs, the values for the one or more meta words, and the locations in the web index of the one or more meta words, wherein an updated web index is generated; and
a storing component configured for storing the updated web index.

12. The system of claim 11, further comprising:
a determining component configured for determining that the one or more web page addresses have associated data that has been updated.

13. The system of claim 11, wherein the updated web index is generated at pre-determined intervals of time.

14. The system of claim 11, wherein the updated web index is generated one time per day.

15. The system of claim 11, wherein at least one of the one or more meta words received is not currently contained in the web index.

16. The system of claim 11, wherein the one or more web page addresses and associated data are received in the form of one or more data files.

17. The system of claim 11, wherein the associated data is related to one or more of a language of a web document, a location of the web document, or a type of the web document.

18. One or more computer-storage media not consisting of a signal and having computer-executable instructions embodied thereon that, when executed, perform a method for dynamically updating a web index with a spam meta word and associated metadata to generate an updated web index, the method comprising:
receiving one or more web page addresses and associated spam metadata for each of the one or more web page addresses to be utilized to update the web index, wherein the associated spam metadata includes a spam meta word, a value for the spam meta word, and a location of the spam meta word in the web index;
accessing a data store to determine one or more document identifications ("document IDs") for the one or more web page addresses received, wherein each of the one or more web page addresses has an associated document ID, wherein the data store includes stored web page addresses that are paired with stored document IDs, and wherein a pairing between a stored web page address and a stored document ID indicates that the document ID corresponds to the stored web page address;
determining the document ID that corresponds to each of the one or more web page addresses received based on a pairing between the web page address and the document ID as stored in the data store;
associating the one or more document IDs with the one or more web page addresses and associated spam metadata received;
replacing the one or more web page addresses with the one or more corresponding document IDs, wherein the associated data received is associated with the corresponding document IDs;
generating a reverse index comprising information used to update the web index, wherein the reverse index is indexed by the received spam meta words, each of the received spam meta words being associated with the corresponding one or more document IDs, the value for the spam meta word for each document ID, and the location of the spam meta word in the web index;
updating the corresponding spam meta word in the web index with each of the associated document IDs, the spam meta word values, and the locations of the spam meta words in the web index to generate an updated web index, wherein within the updated web index the spam meta word is associated with the corresponding document ID instead of being associated with a web page address, wherein updating the corresponding spam meta word in the web index occurs without replacing the entire web index; and storing the updated web index.

19. The system of claim 18, wherein the spam meta word received is not currently contained in the web index.

20. The media of claim 18, further comprising:
receiving a query from a user; and
searching the updated web index for the query.

* * * * *